(12) United States Patent
Barford (10) Patent No.: US 7,729,889 B2
(45) Date of Patent: Jun. 1, 2010

(54) RANDOM SAMPLE TIMING METHOD AND SYSTEM USING SAME

(75) Inventor: Lee A. Barford, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 497 days.

(21) Appl. No.: 11/274,213

(22) Filed: Nov. 15, 2005

(65) Prior Publication Data

US 2007/0112545 A1   May 17, 2007

(51) Int. Cl.
*H04B 15/00* (2006.01)
(52) U.S. Cl. .................................................... 702/191
(58) Field of Classification Search .................. 702/191
See application file for complete search history.

(56) References Cited

U.S. PATENT DOCUMENTS 6,735,539 B2    5/2004    Barford

FOREIGN PATENT DOCUMENTS

WO        WO 99/18520        4/1999

OTHER PUBLICATIONS

J R Smith (Phase of harmonic components to optimize measured sign-to-noise ratio of transfer functions, Meas. Sci. Techno 6, (1995) 1343-1348, publication May 16, 1995), p. 1343-1348.*
Denise M. Bland (the effect of sampling Jitter in a Digitized signal, IEEE 1997, International Symposium on circuit and systems, Jun. 9-12, 1997, Hong Kong), 2685-2688.*
http://www.merriam-webster.com/dictionary/frequency, p. 1.*
John A. Robinson and Michael S. Ren, Data-Dependent Sampling of Two-Dimensional Signals, Multidimensional Systems and Signal Processing, 6, 89-111 (1995) Kluwer Academic Publishers, Boston. Manufactured in The Netherlands. p. 89-111.*

Signal-to-noise ratio, From Wikipedia, p. 1-5, Jun. 19, 2009.*
E. Lahalle et al., "Continuous ARMA Spectral Estimation from Irregularly Sampled Observations," IMTC 2004—Instrumentation and Measurement Technology Conference, Como, Italy, May 18-20, 2004, pp. 923-927.
G. Pasini et al., "Hardware Implementation of a Broad-Band Vector Spectrum Analyzer Based on Randomized Sampling," IMTC 2004—Instrumentation and Measurement Technology Conference, Como, Italy, May 18-20, 2004, pp. 952-957.
G. Golub and C. Van Loan, Matrix Computations 2nd Edition, The Johns Hpkins University Press, 1989, Chapter 5, pp. 193-259 and Chapter 12, Section 6, pp. 592-600.
Proceedding Of The 17th IEEE Instrumentation And Measurement Technology Conference (IMTC), 2000, vol. 2, pp. 1035-1040, "Signals Spectrum Analysis And Period Estimation By Using Delayed Signal Sampling", Peretto, L. et al.
Conference Recordings Of The 5th IEEE Instrumentation And Measurement Technology Conference (IMTC), 1988, pp. 391-398, Apr. 22, 1998, "Digital Spectra Of Non-Uniformly Sampled Signals: Theories And Application: Fundamentals And High Speed Waveform Digitizers", Jeng, Y.C.
The British Search Report Dated: Dec. 15, 2006.
Susan Blackford, "QR Factorization," http://www.netlib.org/lapack/lug/node40.html, (Oct. 1, 1999); pp. 1-2.
Hostetter, G, Recursive discrete Fourier transformation with unevenly spaced data. IEEE Transactions on Acoustics, Speech and signal processing. Feb. 1963, vol. 31, Issue 1, pp. 206-209.
House, M. G.; Mountcastle, P. D.: Technique for Frequency Analysis of Unevenly Sampled Radar Data. IEEE Proceedings of the Radar Conference, Apr. 22-25, 2002, pp. 63-67.

* cited by examiner

*Primary Examiner*—Tung S Lau (57)   ABSTRACT

A method of random sampling a signal includes determining a bounded sample timing interval, and acquiring a sample of the signal at random sample times within the bounded sample timing interval. Sample acquisition is repeated until the signal to noise ratio of an estimated spectrum of the signal, produced from the acquired samples, achieves a target signal to noise ratio.

19 Claims, 5 Drawing Sheets

RANDOM SAMPLE TIMING METHOD AND SYSTEM USING SAME

CROSS-REFERENCE TO RELATED APPLICATIONS

N/A

STATEMENT REGARDING FEDERALLY SPONSORED RESEARCH OR DEVELOPMENT

N/A

BACKGROUND

Data collection networks often sample data at a first location and then transmit the sampled data to another location for processing and analysis. In some data collection networks, data may be sampled randomly or irregularly as a function of time. In particular, a time interval between individual samples may vary essentially randomly as a function of time.

Examples of such data collection networks include, but are not limited to, a wideband test system with random sampling and a time synchronized, low power network of sensors. A wideband test system with random sampling, when accompanied by accurate timestamping (e.g., time synchronization) of the samples, facilitates wideband signal characterization using average sample rates far below a conventional Nyquist sampling rate for the signal. In another wideband signal test situation, particular tests often require accurate data across limited spectral range (e.g., one-tone and two-tone tests of radio frequency devices). In such situations, randomized data sampling may minimize a total amount of data required for performing the tests. With respect to low-power networked sensors, a power consumption of each sensor is often directly related to a sample rate of the sensor. In many situations, reducing the data rate by employing randomized sampling facilitates low-power operation. In addition, constraints imposed by the network (e.g., network protocols and associated timing) often place practical restrictions on sampling intervals resulting in uneven or irregularly spaced samples. U.S. Pat. No. 6,735,539 B2 to Barford, incorporated herein by reference, teaches such a system using networked sensors with unevenly spaced samples having timestamps.

A number of techniques are known for handling spectral estimation from unevenly spaced, irregular, or randomly spaced timestamped data. Among the known techniques are Autoregressive Moving Average (ARMA) methods, Discrete Fourier Transform (DFT) methods, and Matrix Factorization (MF) Methods. ARMA methods fit a set of timestamped input data to an ARMA model. ARMA methods require excessively high computation times rendering such methods unsuitable for many real-time applications. DFT methods typically require extremely large sets of input data with relatively small inter-sample time spacing to minimize errors in summations approximating Fourier integrals of the DFT. MF methods include, but are not limited to, methods that attempt to fit a least-squares spectrum to the sampled data. No practical means of determining a sufficient number of samples exists for such MF methods resulting in the need for excessively long measurement and computation times especially when considering real-time operations, such as in a manufacturing environment.

Accordingly, it would be desirable to have an approach to random sampling that generated timestamped samples for use in spectral estimation with networked sensors. Such an approach would solve a long-standing need in the area of spectral estimation.

BRIEF SUMMARY

In some embodiments of the present invention, a method of random sampling is provided. The method comprises determining a bounded sample timing interval; and acquiring a sample at a random sample time within the bounded sample timing interval. A sample is acquired until a signal to noise ratio of an estimated spectrum from the acquired samples achieves a target signal to noise ratio.

In some embodiments of the present invention, a test system is provided. The test system comprises a sampler that acquires samples from one of a signal and a process. The test system further comprises a spectral estimator in communication with the sampler. One or both of the sampler and the spectral estimator comprise a computer program having instructions that implement determining a bounded sample timing interval and that implement acquiring a sample of the signal or the process at random sample times within the bounded sample timing interval, wherein the acquired sample is timestamped. A sample is acquired until a signal to noise ratio of an estimated spectrum from the acquired timestamped samples achieves a target signal to noise ratio.

In some embodiments of the present invention, a networked sensor system is provided. The networked sensor system comprises a network appliance that produces timestamped samples. The networked sensor system further comprises a sample timing module that determines a bounded sample timing interval; and a computational node in communication with the network appliance. The timestamped samples are produced at random sample times within the bounded sample timing interval and communicated to the computational node until a signal to noise ratio of an estimated spectrum from the timestamped samples achieves a target signal to noise ratio.

Certain embodiments of the present invention have other features in addition to and/or in lieu of the features described hereinabove. These and other features of the invention are detailed below with reference to the following drawings.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Embodiments of the present invention facilitate sampling of a signal or a process as a function of time (hereinafter 'time sampling') and estimating a spectrum from timestamped data produced by the sampling. In particular, an embodiment of the present invention facilitates determining and implementing a time spacing or time step between samples acquired from the signal or the process. In addition, an embodiment of the present invention provides for determining when a sufficient number of timestamped samples of the signal or the process have been acquired to support estimating or computing the spectrum therefrom. The signal or the process that is time sampled may be essentially any signal or any process, including but not limited to, a signal or a process that is monitored remotely by a networked sensor.

For example, the signal may be a signal from a device under test (DUT) wherein a test or measurement system samples the signal for spectral estimation. In another example, a sensor may sample a physical process (e.g., temperature, radiation, etc.) as a function of time and relay the sampled data to a processor for spectral estimation. Various other embodiments of the present invention are applicable to essentially any situation in which spectral estimation is performed on sampled data. For example, in some embodiments, the time sampling is performed by a network capable application processor (NCAP) associated with a networked smart sensor (e.g., smart transducer interface module (STIM)) such as those described by an IEEE STD 1451 family of Smart Transducers Interface Standards. Therefore, the term 'signal' will be used hereinafter to refer to either a signal or a process for the purpose of simplicity herein and not by way of limitation.

According to some embodiments of the invention, the samples acquired as a function of time (hereinafter 'time samples') and employed are sampled at irregular or random time steps or time intervals resulting in randomly spaced time-sampled data. In particular, 'randomly spaced time-sampled' data or simply 'randomly sampled' data comprises a set of data points wherein a sample time interval or time spacing between pairs of adjacent data points differs or varies as a function of time from one sample to a next sample. For example, sampled data generated by measurement equipment (e.g., sensors) that sample an analog signal with a sample clock that varies randomly about a mean sample interval is randomly sampled data. In some embodiments, the randomly sampled data is generated using a sample time interval that is a bounded random function of time. For example, the sample time interval may be bounded by one or both of a minimum interval and a maximum interval. In another example, the sample time interval may vary randomly within a bounded interval about the mean sample interval.

As used herein, a 'bounded' sample timing interval means a sample time interval having one or both of an upper bound and a lower bound. For example, in some embodiments, the bounded sample timing interval may have a lower bound but no upper bound (e.g., the upper bound is effectively infinite). In some embodiments, either or both of the upper and lower bounds are deterministic bounds. A deterministic bound is a bound or a limit having a particular, predetermined fixed value. For example, a deterministic lower bound of sample timing interval indicates a minimum allowed value for the interval (e.g., 5-msec). No sample timing interval may be less than the minimum value dictated by such an exemplary deterministic lower bound. In short, a deterministic bound establishes a limit that is not to be crossed.

In some embodiments, one or both of the upper and lower bounds are probabilistic bounds. As used herein, a probabilistic bound a bound or limit that has a predetermined probability of being exceeded or crossed. For example, a sample timing interval having a probabilistic upper bound may have a 99-percent probability of being below the upper bound and a 1-percent probability of being above the upper bound. As such, with a probabilistic bound there is a finite probability that the sample interval will exceed or cross the probabilistic bound. In some embodiments, a probabilistic bound is essentially equivalent to an 'approximate' bound or limit, acting more as guideline than a strict bound or limit.

Included in the definition of 'randomly sampled' or 'randomly spaced time-sampled' data is timestamped sampled data that was originally regularly spaced time-sampled data wherein some of the data points or samples have been lost, corrupted, or otherwise rendered unusable. For example, regularly spaced time-sampled data transmitted over a lossy network, in which samples are intermittently lost during transmission, produces randomly sampled data, as used herein.

In some embodiments, an estimated spectrum produced from the randomly sampled data is provided in vector form. In particular, in such embodiments, the estimated spectrum is provided as a vector of amplitude and phase values. In other embodiments, the estimated spectrum is provided as a vector comprising real and imaginary values. Furthermore, some embodiments estimate the spectrum at arbitrary predetermined frequencies.

A spectral estimation used to estimate or compute the spectrum according to the embodiments of the present invention employs a least-squares methodology that fits a 'least-squares' spectrum to the available sampled data. In some embodiments, the estimated spectrum produced by the spectral estimation uses a near-minimum number of samples. In particular, the near-minimum number of samples is identified using a number of floating point operations only slightly greater than that required to solve a least squares fit to estimate the spectrum, according to these embodiments. In some embodiments, a trade-off between spectrum computation time and spectrum accuracy may be made by controlling operation of the spectral estimation. An implicit recognition of the near-minimum number of samples is employed in determining when a sufficient number of timestamped samples of the signal has been acquired.

In general, each data point of the time sampled data is associated with a timestamp indicating a sample time of the data point. The timestamp may be an actual or explicit timestamp generated by a sampler and transmitted along with the data point to a processor. For example, the sampler may record a pair of values $(t_n, y_n)$ where '$t_n$' represents an actual sample time and '$y_n$' denotes an actual sample value. Alternatively, the timestamp may be a virtual timestamp where only the sample value is recorded by the sampler and the sample time is provided implicitly. For example, the sampler may employ a sample clock or sample timer having a sequence of sample times that is known a priori. The a priori known (i.e., virtual or implicit) sample times may be either regularly or irregularly (e.g., randomly) spaced apart from one another. As such, the virtual timestamp is often associated with data in which the sample time is inferred from a way in which the sample is generated by the sampler.

Furthermore, the timestamp may be either a relative timestamp (e.g., indicating elapsed time since the last sample) or an absolute timestamp (i.e., based on a fixed reference or starting time). As such, an actual timestamp may be a relative timestamp or an absolute timestamp. Similarly, a virtual timestamp may be either relative or absolute. For example, one or more of an absolute actual timestamp, a relative actual timestamp, an absolute virtual timestamp and a relative virtual timestamp may be employed. For simplicity of discussion and not by way of limitation, absolute actual (explicit) timestamps are employed hereinbelow. One skilled in the art may readily employ any of the other above-mentioned timestamps and still be within the scope of the embodiments of the present invention.

The timestamped data may be taken or sampled at a slow average sample rate relative to a Nyquist sample rate for data. In particular, an average sample frequency may be lower than any of the frequencies of interest in the spectrum being estimated. In addition, relatively long gaps in the data are tolerated. As such, measurement equipment that has a long recovery time relative to a time scale of the signal being measured may be employed to take the samples. Allowing for long recovery times or relatively low sample frequencies or both facilitates measurement equipment design by focusing real-time aspects of the measurement equipment on generating timestamps and away from delivering data.

In some embodiments, the timestamped data is represented by a data stream. As used herein, 'data stream' refers to either a fixed size set of data points (e.g., a fixed length list of timestamped data points) or a sequence of timestamped data points that arrive at a processing location over a period of time. In particular, when employing the sequence of timestamped data points, some embodiments of the invention simply may pause and wait for a next or an additional new timestamped data point to arrive prior to continuing to process the data stream. Thus, some embodiments of the invention may be employed to generate a spectral estimate of a 'complete' set of timestamped data where the complete set represents all of the data that is or will be available. Other embodiments of the invention may generate a preliminary estimate that is subsequently updated as new data in the data stream arrives and is processed.

In general, a data stream D may be represented as a set of pairs of values $(t_n, y_n)$, each pair comprising a timestamp $t_n$ value and a corresponding data point $y_n$, value, where n is an index of each of the pairs, and wherein the term 'index' refers to a location of the pair within the data stream. In particular, in some embodiments, the data stream D is a set of value pairs $(t_n, y_n)$, the set having a cardinality or a size $|T|$ (i.e., n=1, 2, ..., $|T|$). Therefore, the data stream D may be defined by equation (1)

$$D=\{(t_1,y_1),(t_2,y_2),\ldots,(t_{|T|},y_{|T|})\} \quad (1)$$

Since the size $|T|$ is a variable, such a definition of the data stream D accommodates both the fixed size set and the sequentially arriving set, without ambiguity.

Some embodiments of the present invention estimate the spectrum or produce an estimated spectrum at arbitrary pre-determined frequencies of interest $f_m$ indexed on m. In some embodiments, an ordered set of frequencies of interest F of size $|F|$ (i.e., m=1, 2, ... $|F|$) is defined by equation (2)

$$F=\{f_1,f_2,\ldots,f_{|F|}\} \quad (2)$$

where $0<f_1<f_2<\ldots<f_{|F|}$. In some embodiments, the spectrum of the data stream D is estimated at $f_0=0$ Hz.

The estimated spectrum produced by some embodiments of the present invention is a vector S comprising pairs of spectral coefficients, such as real and imaginary spectral amplitudes, $(c_m, s_m)$, or corresponding amplitudes and phases, $(A_m, \phi_m)$, at each of the frequencies in the ordered set of frequencies of interest F. In some embodiments, the estimated spectrum S is given by equation (3)

$$S=\{(c_0,s_0),(c_1,s_1),\ldots,(c_{|F|},s_{|F|})\}$$

or $$S=\{(A_0,\phi_0),(A_1,\phi_1),\ldots,(A_{|F|},\phi_{|F|})\} \quad (3)$$

The spectral estimation determines a least squares fit of the available data to a spectrum S. In general, the determined least-squares fit essentially represents an approximate solution to an overdetermined problem exemplified by a system of equations, where there are typically more equations than unknowns in the solution (i.e., an overdetermined least-squares (L-S) fitting problem). In the case of the estimated spectrum S, the least-squares fitting finds spectral coefficients (e.g., $(c_m, s_m)$ or equivalently $(A_m, \phi_m)$) that best approximate a true spectrum. In matrix notation, the overdetermined L-S fitting problem is represented as Ax=b, where x and b are vectors and A is a matrix. Generally speaking, the goal of solving any overdetermined problem is to find a solution x that makes Ax reasonably 'close' to b. In terms of the least-squares fit, the goal is to find a solution vector x that minimizes a difference Ax−b in a 'least-squares' sense (i.e., minimize $\|Ax-b\|_2$ where $\|\bullet\|_2$ is the matrix 2-norm).

In general, various decompositions or factorizations including, but not limited to, QR factorization and singular value decomposition (SVD), are employed to perform a least-squares (L-S) fit. The QR factorization determines a pair of factor matrices, Q and R, a product of which equals to the matrix A. In general, the matrix A is an m-by-n matrix of real numbers (i.e., $A \in \Re^{m \times n}$) where m and n are integers and $m \geq n$. The factor matrix R is an m-by-n upper triangular matrix (i.e., $R \in \Re^{m \times n}$) defined as a matrix in which all off-diagonal matrix elements below a principle diagonal are identically zero and the factor matrix Q is an orthogonal m-by-m matrix (i.e., $Q \in \Re^{m \times m}$) Thus, the QR factorization of the matrix A may given by equation (4)

$$A = QR \quad (4)$$

$$\text{where } R = \begin{bmatrix} r_{1,1} & r_{1,2} & \ldots & r_{1,n} \\ 0 & r_{2,2} & \ldots & r_{2,n} \\ 0 & 0 & \ddots & \vdots \\ 0 & 0 & \ldots & r_{n,n} \\ 0 & 0 & \ldots & 0 \\ \vdots & \vdots & \vdots & \vdots \\ 0 & 0 & 0 & 0 \end{bmatrix}$$

where a product of the factor matrix Q and a transpose thereof equals an identity matrix (i.e., $Q^T Q = I$) and all elements of the factor matrix R below a main diagonal comprising elements labeled $r_{1,1}$ through $r_{n,n}$ are equal to zero.

Typically, the QR factorization of the matrix A may be realized in a number of different ways including, but not limited to, a Householder transformation, a Givens transformation, Block Householder transformation, and a Fast Givens transformation. Details of each of the transformations listed above, as well as other QR factorizations, may be found in a number of text books on linear algebra and matrix computations known to those skilled in the art including, but not limited to, that by Golub and Van Loan, *Matrix Computations*, 2$^{nd}$ Ed., The Johns Hopkins University Press, Baltimore, Md., 1989, incorporated by reference herein in its entirety. In practice, QR factorizations are generally available as functions or subroutines associated with computer programs and related numerical computational environments including, but not limited to, Matlab®, published by The Mathworks, Inc., Natack, Mass., and LAPACK, distributed and maintained by http://www.netlib.org. One skilled in the art will readily recognize that other decompositions and methods of solving the L-S equation may be substituted for the QR factorization without departing from the scope of the various embodiments of the present invention.

Figure 1:
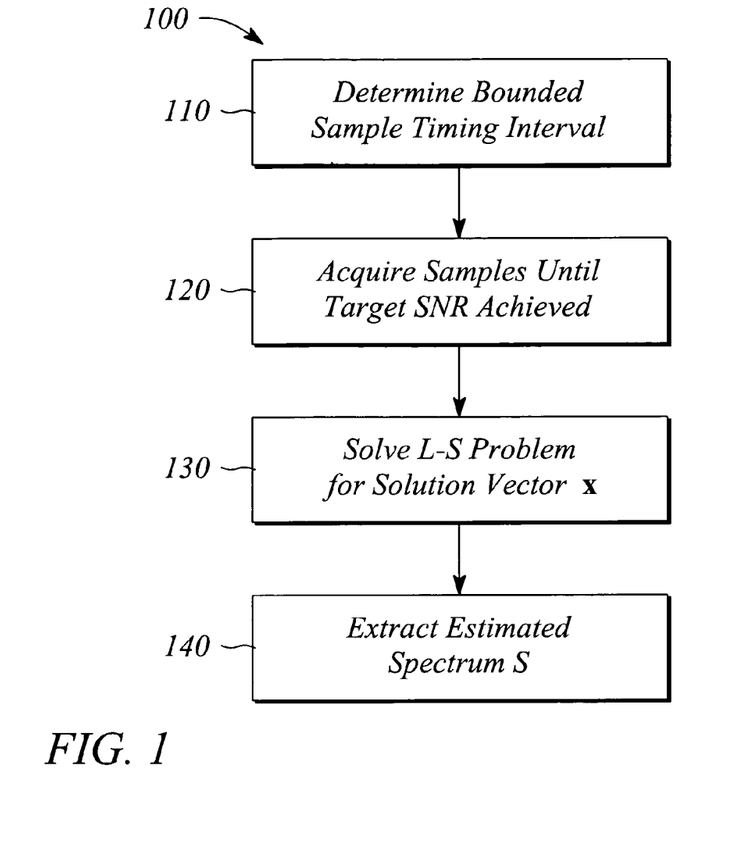
FIG. 1 illustrates a flow chart of a method of random sampling according to an embodiment of the present invention.

FIG. 1 illustrates a flow chart of a method 100 of random sampling according to an embodiment of the present invention. The method 100 of random sampling employs a bounded interval between samples (i.e., a sampling timing interval) that is based on a set of arbitrary predetermined frequencies of interest F of a spectral estimation. Furthermore, the method 100 of random sampling produces a sufficient number samples to enable an estimated spectrum generated therefrom to meet or achieve a predetermined target signal to noise ratio (SNR).

Figure 2A:
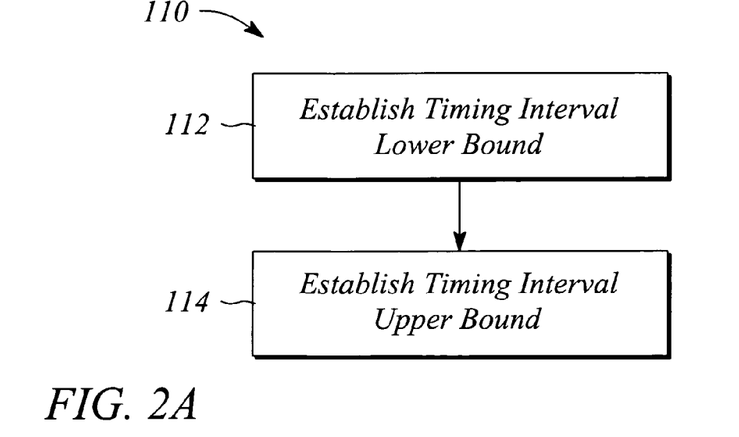
FIG. 2A illustrates a flow chart of determining a bounded sample timing interval according to an embodiment of the present invention.

The method 100 of random sampling comprises determining 110 a bounded sample timing interval from the set of predetermined frequencies of interest F. FIG. 2A illustrates a flow chart of determining 110 a bounded sample timing interval according to an embodiment of the present invention. As illustrated in FIG. 2A, determining 110 comprises establishing 112 a lower bound of the timing interval which is equivalent to setting a minimum time step or spacing between adjacent sampling times. The lower bound is a function of both a size |F| or number of individual frequencies in the set of predetermined frequencies of interest F and a lowest frequency in the set that is not equal to zero Hertz (i.e., $f_1 > 0$ Hz). In some embodiments, the established 112 lower bound or minimum time step $\Delta t_{min}$ is given by equation (5)

$$\Delta t_{min} \geq 2/f_1/(2|F|+1) \quad (5)$$

Since the lower bound or minimum time step $\Delta t_{min}$ is the minimum spacing between samples, given a sample time $t_0$ for a current or previous sample, a next sample will have a sample time that is at least the previous sample time $t_0$ plus the minimum time step $\Delta t_{min}$. The minimum time step $\Delta t_{min}$ insures that a number of samples is taken that equals at least two times a number of frequencies in the set of predetermined frequencies of interest F plus 1 (i.e., 2|F|+1), wherein the number of samples is taken from at least two periods of a lowest frequency of interest $f_1$ that is not equal to zero.

Determining 110 further comprises establishing 114 an upper bound of the timing interval. In general, the upper bound or maximum time step $\Delta t_{max}$ may be established 114 by an arbitrary choice provided that the bound is greater than the minimum time step $\Delta t_{min}$. For example, the maximum time step may be established 114 by various engineering considerations associated with an application of the method 100 of random sampling. In some embodiments, the maximum time step $\Delta t_{max}$ is at least one and one half times the minimum time step $\Delta t_{min}$. In particular, in such embodiments, the established 114 maximum time step $\Delta t_{max}$ is given by equation (6)

$$\Delta t_{max} \geq 1.5 \Delta t_{min} \quad (6)$$

Referring back to FIG. 1, the method 100 of random sampling further comprises acquiring 120 samples until a target signal to noise ratio (SNR) of the estimated spectrum is achieved. Specifically, a signal is sampled, and successive timestamped samples or sets of the sampled signal are generated and combined with previously acquired timestamped samples. A measure of the signal to noise ratio evaluated using the combined timestamped samples is used to determine when the target signal to noise ratio is or has been achieved. In some embodiments, an actual estimated spectrum for the sampled signal is produced only after the target signal to noise ratio is achieved. In particular, in some embodiments, the measure is evaluated without computing the actual estimated spectrum to reduce a computational load or effort.

Figure 2B:
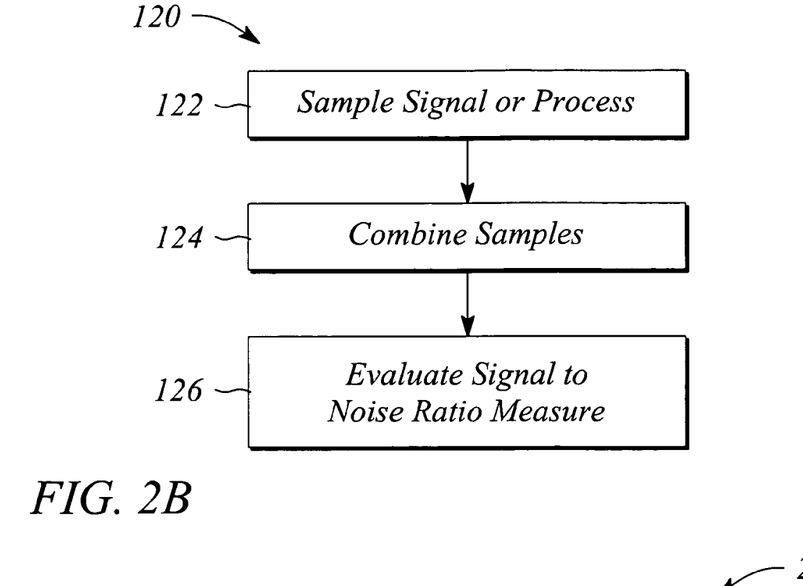
FIG. 2B illustrates a flow chart of acquiring samples until a target signal to noise ratio (SNR) of an estimated spectrum is achieved according to an embodiment of the present invention.

FIG. 2B illustrates a flow chart of acquiring 120 samples until a target signal to noise ratio (SNR) of the estimated spectrum is achieved according to an embodiment of the present invention. As illustrated in FIG. 2B, acquiring 120 samples comprises sampling 122 the signal using the bounded sample timing interval to produce a timestamped sample. Sampling 122 produces a newly acquired sample. In some embodiments, a bounded random time step $\Delta t_r$ is generated during sampling 122. The bounded random time step $\Delta t_r$ is greater than or equal to the determined 110 minimum time step $\Delta t_{min}$ but less than or equal to the determined 110 maximum time step $\Delta t_{max}$.

For example, a random number generator may be employed to generate a random value $z_r$ between zero and one (i.e., $0 \leq z_r \leq 1$). The generated random value $z_r$ is then scaled such that a value of zero is mapped to the minimum time step $\Delta t_{min}$ while a value of one is mapped to the maximum time step $\Delta t_{max}$. An exemplary scaling of the random value $z_r$ is described by equation (7).

$$\Delta t_r = (\Delta t_{max} - \Delta t_{min}) z_r + \Delta t_{min} \quad (7)$$

The bounded random time step $\Delta t_r$ is added to a sample time $t_0$ of a previous sample to generate a next sample time $t_{next}$ (e.g., $t_{next} = t_0 + \Delta t_r$). Sampling 122 generates or takes a sample of the signal at the next sample time $t_{next}$ to produce a new sample. An appropriate timestamp is then added to the new sample during sampling 122.

Acquiring 120 samples further comprises combining 124 the samples such that the new sample produced by sampling 122 is combined with previous samples. The previous samples may be a set of timestamped samples produced by sampling 122 at previous sample times $t_p$ (i.e., $t_p < t_{next}$), for example. Combining 124 the samples produces a combined set of timestamped samples that includes both previous timestamped samples and the new timestamped sample. In some embodiments, the new sample may comprise a set of new samples. The combined 124 set of timestamped samples may be represented as a data stream D.

Acquiring 120 samples further comprises evaluating 126 a measure of the signal to noise ratio (SNR) of an estimated spectrum for the combined 124 set of timestamped samples. In some embodiments, the measure of the SNR is proportional to a condition number of a least-squares (L-S) matrix A of a least-squares fit of the combined sample set to the estimated spectrum. Evaluating 126 the measure determines whether or not the measure is less than a predetermined limit $\lambda$. When the measure is less than the predetermined limit $\lambda$, the target SNR is achieved and as such, acquiring 120 may be discontinued.

In some embodiments, evaluating 126 the measure comprises constructing a least-squares (L-S) matrix A of a least squares (L-S) problem that fits the combined set of samples, represented by the data stream D, to the estimated spectrum S. In particular, the L-S matrix A comprises a basis set of a Fourier transform of the sample data produced by sampling 122 and combining 124. A solution vector x for the L-S fitting problem comprises coefficients of the Fourier transform, wherein the coefficients essentially represent the estimated spectrum S. While expressed in terms of matrices herein for discussion purposes, one skilled in the art may readily extend that which follows to other equivalent representations without undue experimentation and still be within the scope of the embodiments of the present invention.

In some embodiments, the L-S matrix A comprises a scale factor, namely $[1/\sqrt{2}]$, in a first column. The L-S matrix A further comprises a first submatrix and a second submatrix following the first column. The first submatrix comprises elements that are sine functions of arbitrary predetermined frequencies F and respective timestamps $t_n$ of the samples in the data stream D. The second submatrix comprises elements that are cosine functions of the arbitrary predetermined frequencies F and respective timestamps $t_n$ of the samples in the data stream D. In some of such embodiments, the L-S matrix A is given by equation (8)

$$A = \begin{bmatrix} \frac{1}{\sqrt{2}} & \sin(2\pi t_1 f) & \cos(2\pi t_1 f) \\ \frac{1}{\sqrt{2}} & \sin(2\pi t_2 f) & \cos(2\pi t_2 f) \\ \frac{1}{\sqrt{2}} & \sin(2\pi t_3 f) & \cos(2\pi t_3 f) \\ \vdots & \vdots & \vdots \\ \frac{1}{\sqrt{2}} & \sin(2\pi t_{|T|} f) & \cos(2\pi t_{|T|} f) \end{bmatrix} \quad (8)$$

where rows are indexed on the timestamps $t_n$, the index n ranging from 1 to |T| (i.e., n=1, 2, ... |T|) Moreover, functions $\sin(2\pi t_n f)$ and $\cos(2\pi t_n f)$ are each row vectors indexed on frequencies $f_m$ of the ordered set of frequencies F and given by equations (9) and (10)

$$\sin(2\pi t_n f) = [\sin(2\pi t_n f_1), \sin(2\pi t_n f_2), \ldots, \sin(2\pi t_n f_{|F|})] \quad (9)$$

$$\cos(2\pi t_n f) = [\cos(2\pi t_n f_1), \cos(2\pi t_n f_2), \ldots, \cos(2\pi t_n f_{|F|})] \quad (10)$$

where 'f' in equations (8), (9), and (10), represents a vector containing frequencies of the of the set of frequencies F indexed on m ranging from 1 to |F| (i.e., m=1, 2, ... |F|). For discussion purposes, an index 'n=1' in equations (9) and (10) represents a first sample, an index 'n=2' represents a second sample, and so on, to a last sample denoted by an index 'n=|T|'. In some embodiments, the first sample need not be a first sample in the data stream D, the second sample need not be a second sample in the data stream D, and so on. In some embodiments, the last sample is a sample with a timestamp that is less than or equal to a last sample, n=|T|, (i.e., ($t_{|T|}$, $y_{|T|}$)) of the data stream D.

One skilled in the art will readily recognize that other forms of the matrix A for determining an estimated spectrum S may exist and thus, may be substituted for that described hereinabove without departing from the scope of the present invention. For example, another known form of the Fourier transform employs an exponential basis set instead of the equivalent sine/cosine basis set. Such a Fourier transform would yield a matrix A comprising terms of the form $e^{j2\pi tf}$. Such an alternative form of the matrix A is clearly within the scope of the present invention.

In general, evaluating 126 the measure comprises determining if the measure of the SNR indicates the target SNR is achieved. In some embodiments, the measure of the SNR may be determined through a direct computation of the estimated spectrum S. In particular, once the L-S matrix A is constructed using the combined set of samples in the data stream D, the spectrum S is estimated therefrom by solving the L-S fitting problem. A SNR of the estimated spectrum S is then evaluated and if the SNR is less that the target SNR, additional samples are acquired 120 by sampling 122 and combining 124, as described above. The measure is evaluated 126 again by constructing another L-S matrix A and by determining the estimated spectrum S, also as described above. Another SNR of the estimated spectrum is evaluated relative to the target SNR until the target SNR is achieved. However, actual computation of the estimated spectrum S is not required to establish the measure that may be used to determine if the target SNR is achieved.

In some embodiments, if the L-S matrix A is nonsingular and a condition number of the L-S fitting problem is sufficiently large, the estimated spectrum S will have an SNR that meets or exceeds the target SNR. Thus, a measure proportional to the condition number of the L-S matrix A may be employed. For example, a QR factorization of the L-S matrix A may be employed to compute or generate a pair of L-S factor matrices Q and R. A measure based on the factor matrix R then may be employed to establish a sufficiency of the samples in the data stream D relative to a goal of achieving the target SNR. Specifically, if the factor matrix R meets a condition that a minimum value element of an absolute value of main diagonal elements of the matrix R is strictly greater than zero, then both the L-S matrix A and the factor matrix R are nonsingular. Moreover, the factor matrix R is nonsingular if a ratio of a maximum value element of an absolute value of main diagonal elements of the matrix R to a minimum value element of an absolute value of main diagonal elements of the matrix R is less than an arbitrary predetermined limit λ, then the estimated spectrum S will have a sufficiently large signal to noise ratio (SNR). In other words, the SNR of the estimated spectrum will have achieved the target SNR. In terms of Matlab®-style matrix functions max(•), min(•), abs(•) and diag(•), a target SNR will be met if the factor matrix R meets the condition given by equation (11)

$$\min(\text{abs}(\text{diag}(R))) > 0 \land \max(\text{abs}(\text{diag}(R)))/\min(\text{abs}(\text{diag}(R))) < \lambda \quad (11)$$

where min(•) is an element-wise minimum function that returns a minimum element of a vector argument, max(•) is an element-wise maximum function that returns a maximum element of a vector argument, abs(•) is an element-wise absolute value function that returns a vector of element-by-element absolute values (i.e., magnitudes) of a vector argument, diag(•) is a diagonal function that returns a vector containing elements of a main diagonal of a matrix argument, and the symbol ∧denotes an ordered 'and' function in which a left hand argument is evaluated before a right hand argument.

The predetermined limit λ may be chosen or determined without undue experimentation for a given situation and a target SNR. In some embodiments, the predetermined limit λ is chosen to be equal to approximately '1.1' (e.g., λ=1.1). In these embodiments, the factor matrix R will have a condition number that is approximately one when the condition given by equation (11) is met (i.e., for λ≅1.1, when equation (11) is met, cond(R)≅1). Moreover, a condition number of the matrix R that is approximately equal to one indicates that the SNR of the estimated spectrum S is approximately that of an actual SNR of the sampled signal. In other words, when the condition number of the matrix R is approximately equal to one, the estimated SNR essentially converges to that of the actual SNR for the sampled signal.

In other embodiments, especially where faster estimation is sought (i.e., a faster estimation speed is desired), larger values of the predetermined limit λ may be employed. In general, values of the predetermined limit λ ranging from approximately one up to or on the order of approximately one thousand (i.e., $1 \leq \lambda \leq 1 \times 10^3$) may be employed to provide a trade off between the SNR of the estimated spectrum S and the estimation speed. In some embodiments, the predetermined limit of λ ranges from approximately one (e.g., ~1.1) up to approximately one hundred.

In other embodiments, an alternate and slightly simpler condition on the factor matrix R that achieves much the same results as that given by equation (11) is given by equation (12)

$$\min(abs(diag(R)))>0 \wedge 1/\min(abs(diag(R)))<\lambda \quad (12)$$

Specifically, if the factor matrix R is strictly nonsingular, a target SNR is achieved if an inverse of a minimum value element of an absolute value of main diagonal elements of the matrix R is less than the predetermined limit λ (e.g., less than 1.1). QR factorization may be accomplished by using functions such as, but not limited to, a 'qr(A)' function of the computer program-based, matrix computational environment Matlab®, or a function 'DGEQRF' of a matrix function library LAPACK, for example.

In some embodiments, during sampling 122, sets or groups of samples are taken instead of individual samples. In particular, groups of contiguous or adjacent samples may be used to improve, through averaging, a SNR of the estimated spectrum S over and above that which would be provided by choosing individual samples. An exemplary description of using groups of samples that may be readily adapted for use in sampling 122 herein, as well as additional discussion of embodiments of combining 124 and evaluating 126, are described by Applicant in co-pending U.S. patent application Ser. No. 11/229,479, incorporated herein by reference in its entirety.

When the measure indicates that the target SNR is achieved, as determined during evaluating 126, acquiring 120 samples may be terminated. However, if the target SNR is not achieved, sampling 122, combining 124 and evaluating 126 are repeated. When repeated, combining 124 and evaluating 126 may be viewed as updating one or both of the L-S matrix A and the factor matrices Q and R. In particular, in some embodiments, the new sample or samples is/are combined 124 with previous samples after which evaluating 126 performed. In other embodiments, the new sample or samples is/are combined 124 during evaluating 126 by simply computing new elements of the L-S matrix A, as described hereinabove with respect to equations (9) and (10). Then the new elements are inserted into the previous L-S matrix A to produce an updated L-S matrix A, as indicated by equation (8). There is no need to re-compute all of the elements of the L-S matrix A since the new elements produced by the new sample(s) are independent from the previous elements associated with the previous samples. Then updated factor matrices Q and R are computed by QR factorization of the updated L-S matrix A.

In other embodiments, combining 124 and evaluating 126 incorporate the new sample or samples directly into the previous factor matrices Q and R to produce updated factor matrices Q and R without first explicitly updating the L-S matrix A. A method of directly updating the factor matrices Q and R is given by Golub et al., *Matrix Computations*, pp. 596-597, incorporated herein by reference. Additionally, updating the factor matrices Q and R essentially eliminates any need for explicitly storing the L-S matrix A in computer memory following performing the QR factorization on a previous L-S matrix A.

Referring back to FIG. 1, the method 100 of random sampling further comprises solving 130 the L-S fitting problem for a solution vector x representing the coefficients of a Fourier transform. Solving 130 the L-S fitting problem comprises setting a vector b equal to sample values $y_n$, where n is indexed on the samples used including those added during any updating of the respective factor matrices Q and R or L-S matrix A (e.g., $b=[y_n]$, n=1, ..., samplesused). Solving 130 further comprises using the vector b and the factor matrices Q and R to solve for a solution vector x according to equation (13)

$$Rx=Q^T b \quad (13)$$

where '$Q^T$' is a transpose of the factor matrix Q. One skilled in the art is familiar with methods of solving matrix equations exemplified by equation (13).

The method 100 of random sampling further comprises extracting 140 the Fourier coefficients from the solution vector x. Extracting 140 the Fourier coefficients produces the estimated spectrum S. In some embodiments, extracting 140 comprises (a) setting a first real coefficient $c_0$ equal to a first element $x_1$ of the solution vector x; and (b) setting a first imaginary coefficient $s_0$ equal to '0' (i.e., $c_0=x_1$, $s_0=0$). For each frequency of the set of frequencies of interest F starting with $f_1$, setting (a) comprises setting each successive real coefficient $c_i$ equal to individual elements of the solution vector x indexed on i plus the size of the set of frequencies of interest F plus one. Additionally, for each frequency of the set of frequencies of interest F starting with $f_1$, setting (b) comprises setting each successive imaginary coefficient $s_i$ equal to individual elements of the solution vector x indexed on i plus one. In other words, for $i \in \{1, \ldots, |F|\}$, set $c_i=x_{i+|F|+1}$, $s_i=x_{i+1}$, where $x=[x_1, x_2, \ldots, x_{2|F|+1}]$.

In some embodiments, extracting 140 further comprises computing amplitudes and phases $(A_m, \phi_m)$ of the estimated spectrum S from the real and imaginary coefficients $(c_m, s_m)$. An i-th amplitude $A_i$ is computed as the square root of a sum of the square of the i-th real coefficient $c_i$ and the i-th imaginary coefficient $s_i$, for i from zero to the size of the set of frequencies of interest F. The i-th phase $\phi_i$ is computed as the inverse tangent of a ratio of the i-th imaginary coefficient $s_i$ and the i-th real coefficient $c_i$, for i from zero to the size of the set of frequencies of interest F. In other words, for $i \in \{0, \ldots, |F|\}$, computing amplitudes and phases comprises setting the i-th amplitude $A_i$ and the i-th phase $\phi_i$, respectively, according to the equations $A_i=\sqrt{c_i^2+s_i^2}$, $\phi_i=\tan^{-1}(s_i/c_i)$.

In some embodiments, the factor matrix Q is stored in memory after each iteration of updating of the factor matrix Q. In other embodiments, the factor matrix Q is not stored explicitly. Instead, the factor matrix Q is stored initially, as described in a description of the DGEQRF routine of LAPACK, cited supra. While known to those skilled in the art, the reference Anderson et al., *LAPACK Users Guide*, 3$^{rd}$ ed., Society for Industrial Applied Mathematics Press, 2000, section entitled "QR Factorization", incorporated herein by reference, provides a complete description of the DGEQRF routine and the respective storage of the factor matrix Q thereby. Then, during updating of the factor matrix Q, one or more Givens rotations describing the updating of the factor matrix Q are stored. Thus, the initially stored factor matrix Q representation and a set of Givens rotations account for the updated factor matrix Q instead of an explicitly stored and updated factor matrix Q. In other words, rather than explicitly storing the updated factor matrix Q, a description of the matrix is stored as a set of steps required to multiply either the factor matrix Q or the transpose of the factor matrix $Q^T$ times a vector. Storing the factor matrix Q in this way may save both memory and computation time since ultimately it is the product of the factor matrix Q and a vector (i.e., the b vector) that is used by the method 100 of random sampling and not the factor matrix Q itself.

Figure 3:
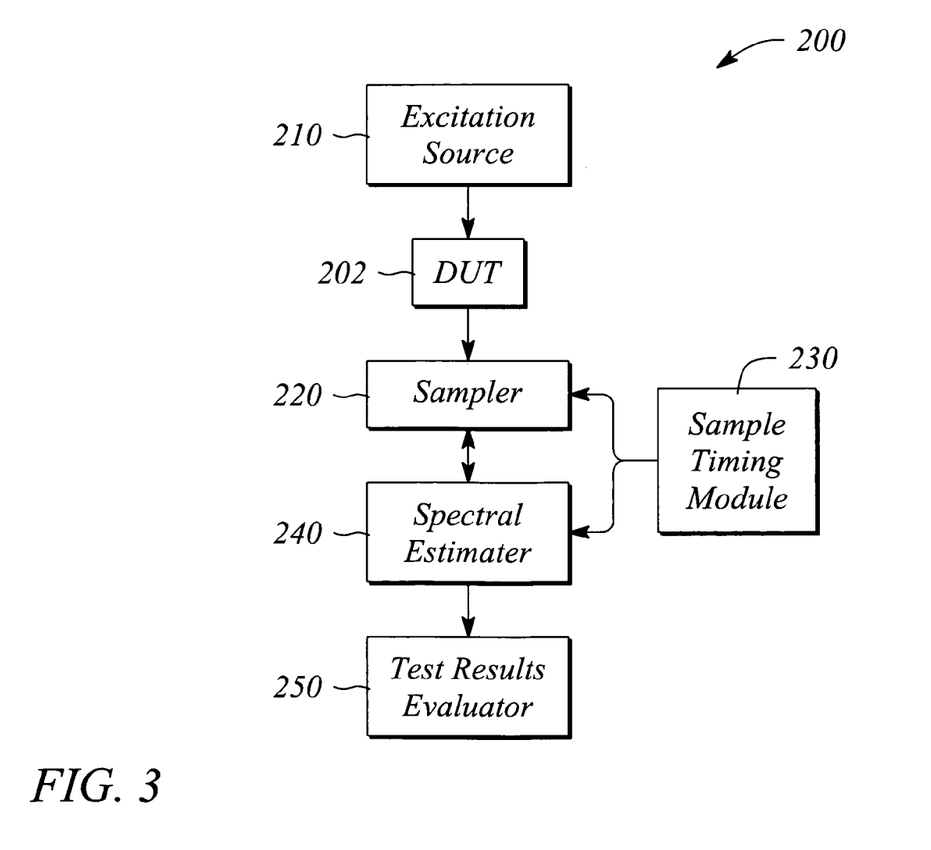
FIG. 3 illustrates a block diagram of a test system according to an embodiment of the present invention.

FIG. 3 illustrates a block diagram of a test system 200 according to an embodiment of the present invention. The test system 200 samples an output signal produced by a device under test (DUT) 202 and generates an estimated spectrum S of the output signal. The test system 200 measures or samples the output signal at random intervals. The samples may be expressed in terms of timestamped sample amplitudes (e.g., $(t_n, y_n)$). In some embodiments, the estimated spectrum S is represented by a vector comprising amplitudes and phases of the spectrum S at predetermined frequencies of interest F. In other embodiments, the estimated spectrum S is represented by a vector comprising real and imaginary coefficients of the spectrum S at predetermined frequencies of interest F. In particular, the estimated spectrum S may be described as in equation (3) hereinabove.

In some embodiments, the test system 200 may comprise an excitation source 210, as illustrated in FIG. 3. A device under test (DUT) 202 is connected between an output of the excitation source 210 and an input of a sampler 220 for testing. The excitation source 210 generates an excitation signal that is applied to the DUT 202. In some embodiments, the excitation source 210 is a periodic excitation source that generates an essentially periodic excitation signal. In other embodiments, the excitation source 210 is a general purpose excitation source (e.g., arbitrary waveform generator) that generates one or both of an aperiodic excitation signal and an essentially periodic excitation signal. In yet other embodiments, the excitation source generates a null signal. For example, a null signal may be employed when testing a DUT 202 that incorporates an internal signal generator (e.g., a clock generator, a function generator, etc.). Such a DUT 202 does not use an excitation signal for test purposes. Thus, in such embodiments, the excitation source 210 may be omitted from the test system 200 and still be within the scope of the present invention.

Figure 4:
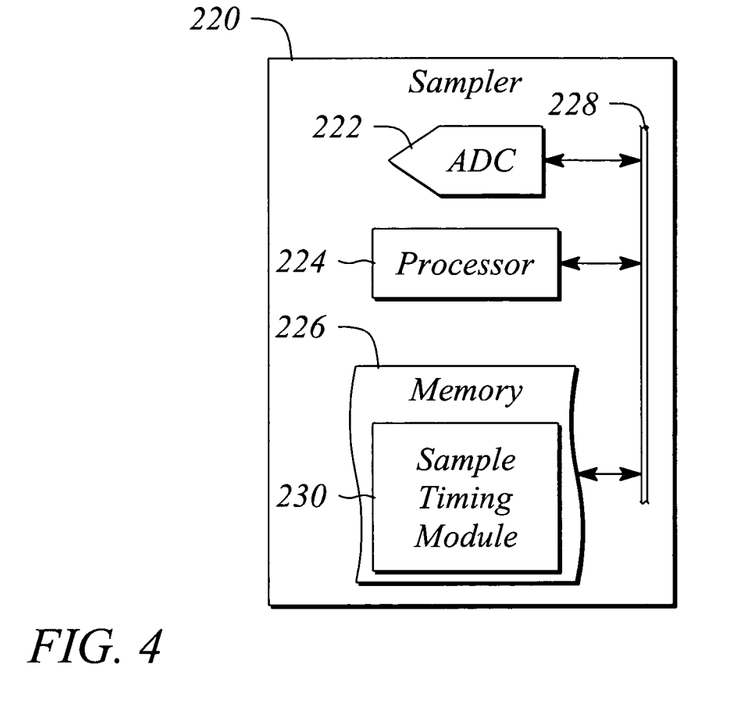
FIG. 4 illustrates a block diagram of a sampler according to an embodiment of the present invention.

The test system 200 further comprises the sampler 220. FIG. 4 illustrates a block diagram of a sampler 220 according to an embodiment of the present invention. In the illustrated embodiments, the sampler 220 comprises an analog to digital converter (ADC) 222. The sampler 220 may further comprise a processor 224 and a memory 226 connected to the ADC 222 via a data bus 228 of the sampler 220, such that the processor 224 controls the ADC 222 and the memory 226 and receives data from the ADC 222 via the data bus 228. For example, the processor 224 may access and execute a computer program stored in the memory 226. The computer program may comprise instructions that, when executed by the processor, facilitate initiating sampling of a signal by the ADC 222. The data received by the processor 224 from the ADC 222 upon the initiation of sampling may comprise samples of the signal. The data may be stored in the memory 226 prior to further processing by the processor 224.

In general, the processor 224 may be a general purpose computer processor or a specialized processor such as, but not limited to, a signal processor. The memory 226 may be one or more of random access memory (RAM), read only memory (ROM), flash memory, or disk memory including, but not limited to, hard disk, compact disk (CD), floppy disk, and digital video disk (DVD), for example. The computer program may be realized using a high level computer programming language or programming environment including, but not limited to, C/C++, FORTRAN, or Matlab®, for example. Alternatively, the functionality represented by the computer program may be essentially realized as computer logic or hardware. For example, the computer program may be essentially hardwired as discrete logic or as an application specific integrated circuit (ASIC). In such embodiments, the computer logic implementation may represent one or more of the computer processor 224 and the memory 226 as well as the computer program.

In other embodiments, essentially any instrument, sensor, or other means capable of measuring a physical quantity and delivering the measured quantity to a means of computation may be employed as the sampler 220. Examples include, but are not limited to, an oscilloscope triggered by a clock with a predetermined trigger time (e.g., alarm), a smart sensor that may operate in a network or that is 'networkable' (see for example the IEEE 1451 series of standards).

The sampler 220 samples an output signal generated by the DUT 202 and converts the samples of the output signal to timestamped sample amplitudes (e.g., $(t_n, y_n)$). In some embodiments, the output signal may be generated by a sensor 202 measuring a physical process (e.g., temperature) instead of by the DUT 202. The timestamped sample amplitudes are essentially equivalent to timestamped measurements of the process measured by the sensor 202.

In some embodiments, the sampler 220 produces a data stream D comprising a sequence of timestamped sample amplitudes or sample data points. For example, the data stream D produced by the sampler 220 may be represented by equation (1) described hereinabove with respect to the method 100 of random sampling. Moreover, while described herein as explicit timestamps, the timestamps associated with the sample amplitudes of the data stream D may be one or more of explicit or implicit timestamps, as described herein with respect to the method 100 of random sampling. In general, the sampler 220 samples at random sample times or random time intervals. However, the sampler 220 may sample at intervals that are one or more of irregular, random, and regular. When sampled at regular intervals, a set of irregular or random samples may result from a loss of one or more samples in the set during transmission from the sampler 220, for example.

The test system 200 further comprises a sample timing module 230. The sample timing module 230 receives and utilizes, as an input, information regarding an ordered set of predetermined frequencies of interest F of size |F| at which a spectral estimation is to be performed. In particular, the set of frequencies of interest F is defined by equation (2) above and includes a lowest frequency $f_1$ wherein the lowest frequency $f_1$ is not equal to zero. The information received and utilized by the sample timing module 230 comprises the size or number of frequencies |F| and the lowest, non-zero, frequency $f_1$ of the set of frequencies of interest F. The sample timing module 230 utilizes the input information to generate a next sample time $t_{next}$ for a next sample. The generated next sample time $t_{next}$ produced by the sample timing module 230 is communicated one or both of directly and indirectly to the sampler 220. The sampler 220 employs either the next sample time $t_{next}$ or information equivalent thereto received from the sample timing module 230 to determine when to acquire a next sample.

In some embodiments, the sample timing module 230 resides in the sampler 220. For example, the sample timing module 230 may comprise a computer program 230 of the sampler 220 illustrated in FIG. 4. In such embodiments, the computer program 230 is stored in the memory 226 of the sampler 220 as one or both of firmware and software. In other embodiments, the sample timing module 230 residing in the sampler 220 may be effectively implemented in whole or in part as hardware such as, but not limited to, a portion of an application specific integrated circuit (ASIC), discrete logic, or similar circuit-based implementation. As such, the sample timing module 230 essentially comprises 'instructions' that are realized either as explicit software/firmware instructions or as hardware operations (i.e., implicit instructions).

Regardless of the specific realization, the instructions (e.g., explicit or implicit) of the sample timing module 230, when executed, implement determining a bounded sample timing interval from the set of predetermined frequencies of interest F. Determining the bounded sample timing interval comprises establishing a lower bound and an upper bound of the sample timing interval. In some embodiments, the lower bound or minimum time step $\Delta t_{min}$ is determined according to equation (5) while the upper bound or maximum time step $\Delta t_{max}$ is determined according to equation (6). In some embodiments, the sample timing module 230 essentially implements determining 110 described hereinabove with respect to the method 100 of random sampling.

In some embodiments, the sample timing module 230 further comprises a random number generator (not illustrated). In some embodiments, the random number generator is implemented as explicit instructions of the computer program 230. In other embodiments, the random number generator is implemented in whole or in part as hardware such as, but not limited to, a portion of an application specific integrated circuit (ASIC), discrete logic, or similar circuit-based implementation.

The sample timing module 230 employs the random number generator to determine a random sampling time for a next sample such that the sampling time lies within the determined bounded sample timing interval. For example, the random number generator may be employed to generate a random value $z_r$ between zero and one (i.e., $0 \leq z_r \leq 1$). The exemplary generated random value $z_r$ may be scaled such that a value of zero is mapped to the minimum time step $\Delta t_{min}$ while a value of one is mapped to the maximum time step $\Delta t_{max}$.

In some embodiments, additional instructions of the sample timing module 230 implement generating a bounded random time step $\Delta t_r$. For example, instructions that implement equation (7) may be employed to generate the bounded random time step $\Delta t_r$. Once generated, additional instructions of the sample timing module 230 implement adding a sample time $t_0$ of a previous sample to the bounded random time step $\Delta t_r$ to generate the next sample time $t_{next}$ (e.g., $t_{next} = t_0 + \Delta t_r$). The next sample time $t_{next}$ is employed by the sampler 220 to acquire the next sample. The next sample, once acquired, is timestamped and added to the data stream D.

In some embodiments, the test system 200 further comprises a spectral estimator 240 in communication with the sampler 220, as illustrated in FIG. 3. The spectral estimator 240 receives the data stream D and generates an estimated spectrum S. The estimated spectrum S is generated for a set of predetermined frequencies of interest F. For example, the set of frequencies of interest F may be an ordered set defined by equation (2) described hereinabove with respect to the method 100 of random sampling. In some embodiments, the spectral estimator 240 communicates with the sampler 220 via a network (not illustrated).

In particular, the spectral estimator 240 requests one or more samples from the sampler 220, in some embodiments. The sampler 220 acquires and transmits the samples as the data stream D to the spectral estimator 240. The spectral estimator 240 determines whether a target signal to noise ratio of the estimated spectrum S is achieved based on the received samples. If the target signal to noise ratio is not achieved, the spectral estimator 240 requests additional samples.

In other embodiments, the sampler 220 acquires and transmits samples to the spectral estimator 240 until instructed by the spectral estimator 240 to stop sending samples. The spectral estimator 240 receives the transmitted samples as the data stream D and determines whether or not the target signal to noise ratio has been achieved. When the target signal to noise ratio is achieved, the spectral estimator 240 instructs the sampler 220 to stop acquiring samples.

In some embodiments, the sample timing module 230 resides in the spectral estimator 240. In such embodiments, one or more of the minimum time step $\Delta t_{min}$, the maximum time step $\Delta t_{max}$, and the next sample time $t_{next}$ are communicated indirectly to the sampler 220 through a connection between the sampler 220 and the spectral estimator 240. For example, one or more of the minimum time step $\Delta t_{min}$, the maximum time step $\Delta t_{max}$, and the next sample time $t_{next}$ may be communicated to the sampler 220 along with one or both of a request for samples and an instruction to stop sending samples. In some embodiments, the spectral estimator 240 and the sampler 220 operate in a cooperative manner to implement acquiring 120 samples described hereinabove with respect to the method 100 of random sampling.

Figure 5:
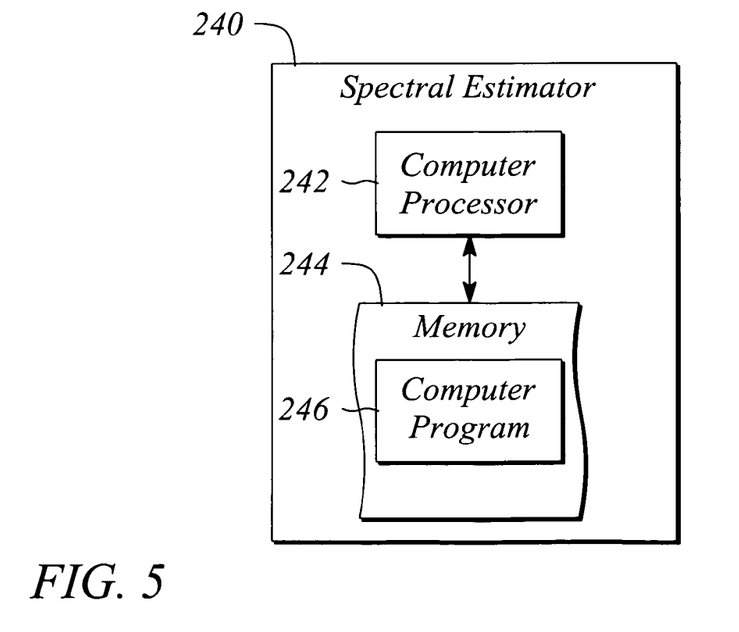
FIG. 5 illustrates a block diagram of the spectral estimator according to an embodiment of the present invention.

FIG. 5 illustrates a block diagram of the spectral estimator 240 according to an embodiment of the present invention. The spectral estimator 240 determines a least squares fit of the available data to the estimated spectrum S. In some embodiments, the spectral estimator 240 comprises a computer processor 242, a memory 244, and a computer program 246 that is stored in the memory 244 and executed by the computer processor 242. For example, the computer program 246 may be software or firmware of the spectral estimator 240. The computer processor 242 may be a general purpose computer processor or a specialized processor such as, but not limited to, a signal processor. The memory 244 may be one or more of random access memory (RAM), read only memory (ROM), flash memory, or disk memory including, by not limited to, hard disk, compact disk (CD), floppy disk, and digital video disk (DVD), for example. The computer program 246 may be realized or classified as software or firmware of the spectral estimator 240, in some embodiments. For example, the computer program 246 may be realized using a high level computer programming language or programming environment including, but not limited to, C/C++, FORTRAN, or Matlab®. In other embodiments, the computer program 246 may be essentially realized as computer logic or hardware. For example, the computer program 240 may be essentially hardwired as discrete logic or as an application specific integrated circuit (ASIC). In such embodiments, the computer logic implementation may represent one or more of the computer processor 242 and the memory 244 as well as the computer program 246.

Regardless of a specific realization, the computer program 246 comprises instructions that, when executed by the processor 242, implement spectral estimation that fits data from the data stream D provided by the sampler 220 to the estimated spectrum S in a least-squares manner. In some embodiments, the spectral estimation implemented by the instructions of the computer program 246 comprises instructions that implement constructing a least-squares (L-S) matrix A and instructions that implement solving an L-S problem to find the estimated spectrum S using the constructed L-S matrix A. The implemented spectral estimation further comprises instructions of the computer program 246 that implement evaluating a measure of the signal to noise ratio (SNR) of the estimated spectrum S produced by the L-S fit and instructions that implement requesting additional samples from the sampler 220 to add to the constructed L-S matrix A until a target or predetermined SNR is achieved.

In particular, a QR factorization of the L-S matrix A is employed in the L-S problem solving, in some embodiments. A measure based on an R factor matrix of the QR factorization of the L-S matrix A is employed to evaluate whether a target SNR is achieved. In some of such embodiments, the measure is given by equation (11) described hereinabove. In other embodiments, the measure given by equation (12) described hereinabove is employed. In yet other embodiments, a condition number of one or both of the factor matrix R and the L-S matrix A is employed. In some embodiments, instructions of the computer program 246 essentially implement combining 124 and evaluating 126 of the method 100 of random sampling described hereinabove.

In some embodiments, the computer program 246 further comprises instructions that implement solving the L-S fitting problem for coefficients of a Fourier transform. In particular, an equation of the form of equation (13) described hereinabove may be employed to solve for the Fourier transform coefficients. In particular, the implemented instructions of solving the L-S fitting problem may be essentially similar to solving 130 described hereinabove with respect to the method 100 of random sampling, in some embodiments.

In some embodiments, the computer program 246 further comprises instructions that implement extracting the Fourier coefficients to produce the estimated spectrum S. The implemented instructions of extracting the Fourier coefficients may be essentially similar to extracting 140 described hereinabove with respect to the method 100 of random sampling. In particular, extracting may produce the estimated spectrum S in the form of real and imaginary coefficients ($c_m$, $s_m$) or amplitude and phase coefficients ($A_m$, $\phi_m$) indexed on the frequencies of interest F.

Referring back to FIG. 3, the test system 200 may further comprise a test results evaluator 250, in some embodiments. The test results evaluator 250 receives the estimated spectrum S from the spectral estimator 240. The received estimated spectrum S is compared to predetermined spectrum criteria or specifications for the DUT 202. If the estimated spectrum S of the DUT 202 meets the criteria, the test results evaluator 250 assigns a passing result to the DUT 202. If the estimated spectrum S fails to meet one or more of the criteria, a failing result is assigned to the DUT 202 by the test results evaluator 240. In some embodiments (not illustrated), the test results evaluator 250 is realized as portion of the computer program 246 of the spectral estimator 240.

Figure 6A:
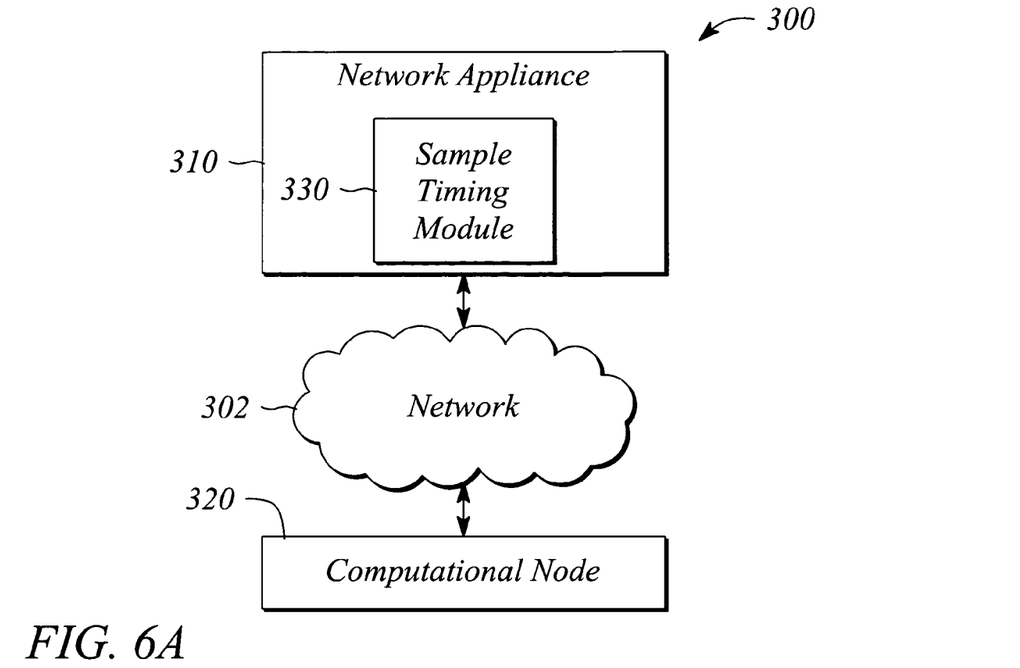
FIG. 6A illustrates a block diagram of a networked sensor system according to an embodiment of the present invention.

FIG. 6A illustrates a block diagram of a networked sensor system 300 according to an embodiment of the present invention. The sensor system 300 samples a signal and generates an estimated spectrum S thereof. The sensor system 300 measures and samples the signal in random intervals bounded by a minimum time step $\Delta t_{min}$ and a maximum time step $\Delta t_{max}$. The samples are expressed in terms of timestamped sample amplitudes (e.g., ($t_n$, $y_n$)). In some embodiments, the estimated spectrum S is represented by a vector comprising amplitudes and phases of the spectrum S at predetermined frequencies of interest F. In other embodiments, the estimated spectrum S is represented by a vector comprising real and imaginary coefficients of the spectrum S at predetermined frequencies of interest F. In particular, the estimated spectrum S may be described as in equation (3) hereinabove. Various elements of the networked sensor system 300 communicate with one another over a network 302. The network 302 may be essentially any arbitrary data network including, but not limited to, one or more of a local area network (LAN), a wide area network (WAN), and a wireless network (e.g., as described by IEEE 802.11a/b/g).

The sensor system 300 comprises a network appliance 310, a computational node 320, and a sample timing module 330. The network appliance 310 produces the timestamped samples of the signal and transmits the samples over the network 302 to the computational node 320. The computational node 320 estimates a spectrum of the signal using the timestamped samples. The computational node 320 further evaluates a measure of a signal to noise ratio (SNR) of the estimated spectrum and determines from the measure whether a target SNR is achieved. The sample timing module 330 uses the predetermined frequencies of interest F to determine the minimum time step $\Delta t_{min}$ and the maximum time step $\Delta t_{min}$. The minimum time step $\Delta t_{min}$ and the maximum time step $\Delta t_{max}$ are used to establish sample times for use by the network appliance 310 in sampling the signal and producing the timestamped samples therefrom.

Figure 7:
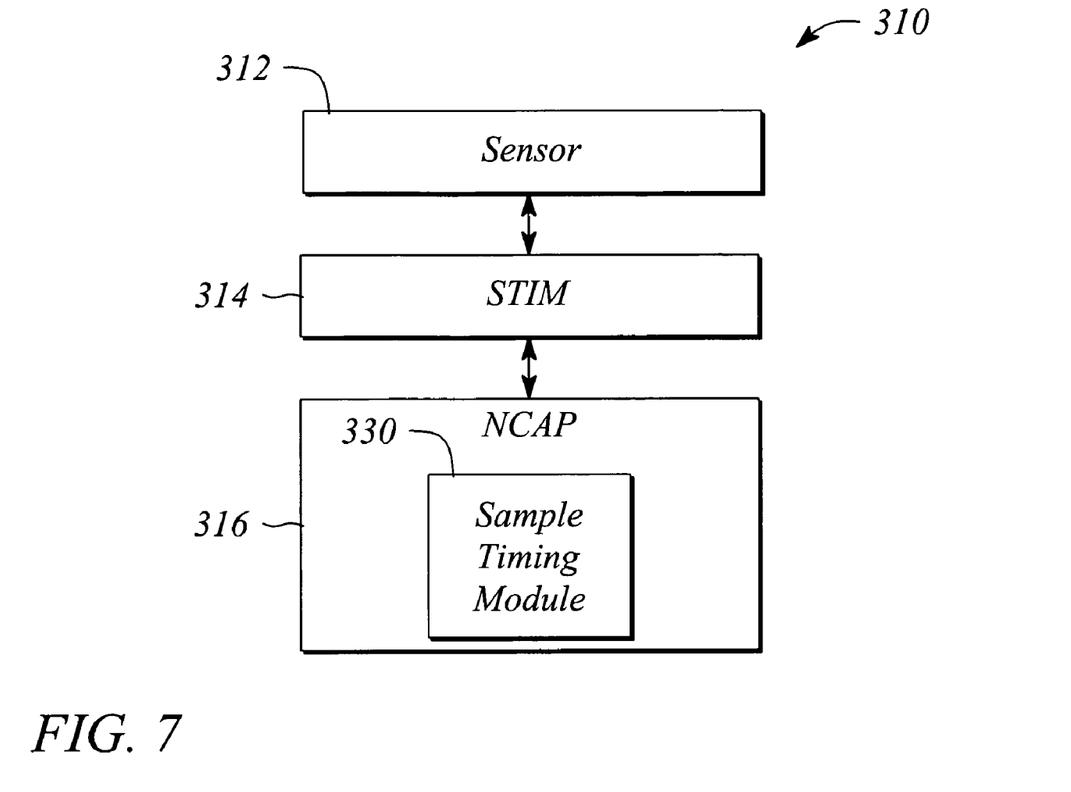
FIG. 7 illustrates a block diagram of a network appliance according to an embodiment of the present invention.

FIG. 7 illustrates a block diagram of the network appliance 310 according to an embodiment of the invention. As illustrated in FIG. 7, the network appliance 310 comprises a sensor or sampler 312. In some embodiments, the network appliance 310 further comprises a smart transducer interface module (STIM) 314, and a network capable processor (NCAP) 316. In such embodiments, the sensor 312 and the STIM 314 working in conjunction produce the samples which are then communicated to the NCAP 316. The NCAP 316 further processes the samples and then transmits the samples using the network 302 to a remote location. For example, the sensor 312, STIM 314, and NCAP 316 may be elements of a smart sensor network described by the IEEE 1451 standard for networked sensors.

As illustrated in FIG. 6A, the sample timing module 330 resides in the network appliance 310, in some embodiments. For example, the sample timing module 330 may comprise a computer program, instructions of which are executed by a processor of the NCAP 316. The sample timing module 330 determines a time at which a measurement or a sample is taken. In some embodiments, the time at which the sample is taken is determined as a random time step bounded by the minimum time step $\Delta t_{min}$ and the maximum time step $\Delta t_{max}$. In some embodiments, the sample timing module 330 essentially implements determining 110 the bounded sample timing interval described hereinabove with respect to the method 100 of random sampling.

In some embodiments, the network appliance 310 receives a request for samples from the computational node 320 via the network 302. For example, the request may instruct the network appliance 310 to begin taking samples and may comprise information regarding a minimum frequency $f_1$ and a number of frequencies |F| of the predetermined frequencies of interest F. In some embodiments, the request may further comprise a maximum time between samples which may be employed by the network appliance 310 as the determined maximum time step $\Delta t_{max}$. Upon receipt of the request, the sample timing module 330 computes the minimum time step $\Delta t_{min}$ using equation (5), for example. In some embodiments, when the maximum time between samples is not included in the request, for example, the maximum time step $\Delta t_{max}$ is also computed by the sample timing module 330 using equation (6).

In some embodiments, the network appliance 310 uses a random number generator to generate a random time for a next sample time $t_{next}$ such that there is at least the minimum time step $\Delta t_{min}$ but no more than the maximum time step $\Delta t_{max}$ between samples. A next sample is taken at the next sample time $t_{next}$ and the sample is timestamped. The timestamped sample is then transmitted to the computational node 320. The network appliance 310 continues to take and transmit samples until instructed by the computational node 320 to stop sampling.

The computational node 320 receives the transmitted, timestamped samples from the network appliance 310 via the network 302, combines the received sample with previously received samples, and estimates a spectrum therefrom. The computational node 320 further evaluates a measure of a signal to noise ratio (SNR) to determine if a target SNR is achieved. In some embodiments, when the target SNR is achieved, the computational node 320 instructs the network appliance 310 to stop sampling.

In some embodiments, the computational node 320 comprises a computer processor, memory, and a computer program. Instructions of the computer program, when executed by the processor, implement combining the received sample with previously received samples, evaluating a measure of the SNR for the combined samples, and in some embodiments, estimating the SNR for the combined samples. In some embodiments, the computational node 320 is essentially the spectral estimator 240 described above with respect to the test system 200. In some embodiments, the instructions of the computer program further implement transmitting a request for samples to the network appliance 310 as well as sending the instruction to stop sampling when the target SNR is achieved.

Figure 6B:
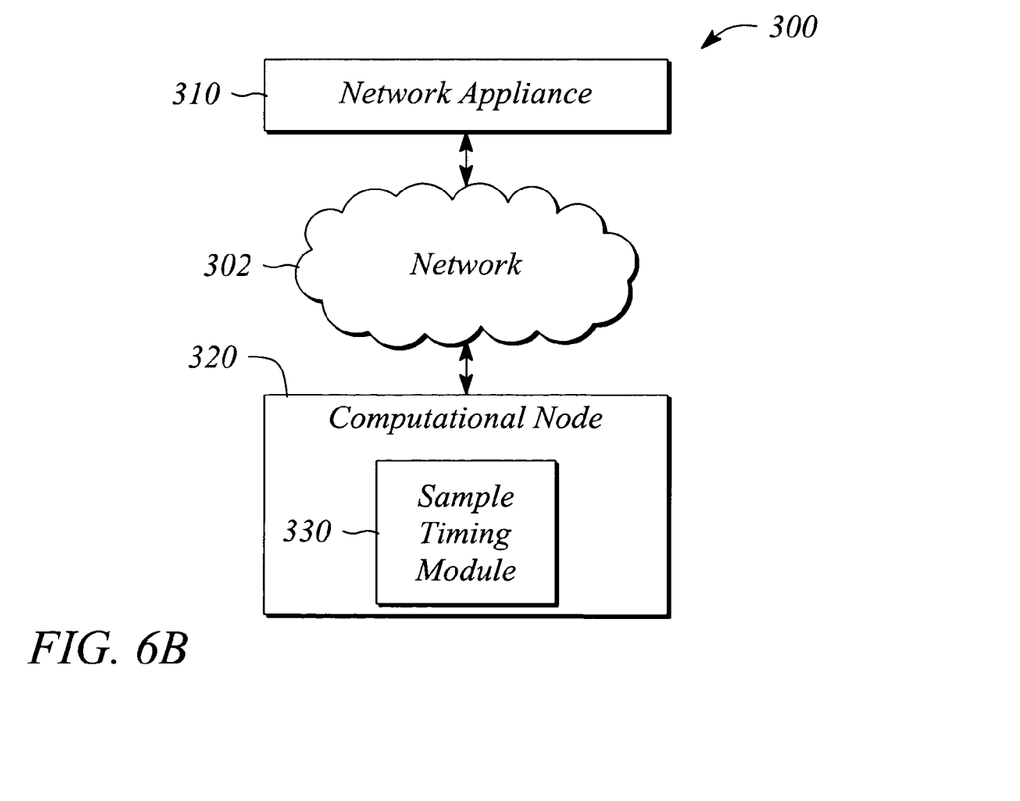
FIG. 6B illustrates a block diagram of a networked sensor system according to another embodiment of the present invention.

FIG. 6B illustrates a block diagram of a networked sensor system 300 according to another embodiment of the present invention. As illustrated in FIG. 6B, the sample timing module 330 resides in the computational node 320. For example, the sample timing module 330 may comprise a portion of the computer program of the computational module 320 described above.

In such embodiments, the timing of each sample is determined at the computational node 320 and is transmitted through the network 302 to the network appliance 310. The network appliance 310 then acquires a sample at the sample time received from the computational node 320 and transmits the sample to the computational node 320. Timestamping may occur either at the network appliance 310 or at the computational node 320.

For example, if a time delay or latency of the network 302 is known, the network appliance 310 may comprise a simple, triggerable sensor. The computational node 320 generates a trigger at a time determined by combining the known latency with a next sample time generated by the sample timing module 330, as described above. The trigger, when received by the triggerable sensor, causes the sensor to sample the signal and transmit the sample to the computational node 320 via the network 302. The computational node 320 continues to generate new triggers that are received by the network appliance 310, and the network appliance 310 accordingly continues to transmit samples to the computational node 320 until the target SNR is achieved, as indicated by the evaluated measure described above. When the target SNR is achieved, the computational node 320 discontinues generating the triggers, such that the network appliance 310 stops sampling.

Configurations of the networked sensor system 300 that are intermediate combinations of that described with respect to FIGS. 6A and 6B are within the scope of the present invention. For example, determining the minimum time step $\Delta t_{min}$ and the maximum time step $\Delta t_{max}$ may be implemented in the computational node 320 while establishing a next sample time $t_{next}$ may be performed by the network appliance 310.

In another example, the system 300 may be illustrated in FIG. 6B such that a request for a sample transmitted to the network appliance 310 includes a next sample time $t_{next}$. However, due to an unknown network latency, for example, the network appliance 310 is not able to actually take the sample precisely at the next sample time $t_{next}$. Instead, the network appliance 310 takes the sample as soon as possible and timestamps the sample according to a clock local to the network appliance 310. In this example, an actual sample time of the timestamped sample does not equal that of the transmitted next sample time $t_{next}$. However, provided that the unknown latency is such that the actual sample time is properly bounded by the minimum time step $\Delta t_{min}$ and the maximum time step $\Delta t_{max}$, the sample can be combined and evaluated in a normal fashion by the computational node 320. Given the discussion above, one skilled in the art may readily devise other variations of the system 300, all of which are within the scope of the present invention.

Thus, there have been described embodiments of a method of random sampling as well as a test system and a network sensor system each of which employs embodiments of random sampling. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A method of random sampling, the method comprising:

employing a processor to determine a bounded sample timing interval; and employing a sampler to acquire a sample at a random sample time within the bounded sample timing interval, wherein acquiring a sample is repeated until a signal to noise ratio of an estimated spectrum from the acquired samples achieves a target signal to noise ratio, wherein employing the sampler to acquire a sample at a random sample time comprises sampling an output signal of a device under test at the random sample time.

2. The method of claim 1, wherein determining a bounded sample timing interval comprises:

employing the processor to establish a lower bound of the bounded sample timing interval, wherein the lower bound is a function of one or both of a number of frequencies in a set of predetermined frequencies of interest and a lowest frequency in the set that is not equal to zero Hertz; and employing the processor to establish an upper bound of the bounded sample timing interval, the upper bound being greater than the lower bound.

3. The method of claim 2, wherein the lower bound is a minimum time step $\Delta t_{min}$ given by $$\Delta t_{min} \geq 2/f_1/(2|F|+1)$$

where $|F|$ is the number of frequencies and $f_1$ is the lowest frequency of the set of frequencies of interest.

4. The method of claim 2, wherein the upper bound is a maximum time $\Delta t_{max}$ given by $$\Delta t_{max} \geq 1.5 \Delta t_{min} \qquad 5$$

where $\Delta t_{min}$ is a minimum time step.

5. A method of random sampling, the method comprising:
employing a processor to determine a bounded sample timing interval; and
employing a sampler to acquire a sample at a random sample time within the bounded sample timing interval,
wherein acquiring a sample is repeated until a signal to noise ratio of an estimated spectrum from the acquired samples achieves a target signal to noise ratio,
wherein the sampler acquires a timestamp associated with each acquired sample.

6. The method of claim 5, wherein acquiring a sample comprises:
employing the sampler to sample one of a signal and a process at the random sample time within the bounded sample timing interval to produce a newly acquired sample;
employing a spectral estimator to combine the newly acquired sample with a previously acquired sample to produce a combined set of samples; and
employing the spectral estimator to evaluate a measure of the signal to noise ratio of the estimated spectrum for the combined set.

7. The method of claim 1, wherein the target signal to noise ratio is achieved when an upper right triangular factor matrix R of a QR factorization of a least squares matrix (L-S) matrix A of a least squares fit of a set of acquired samples to the estimated spectrum meets a condition given by one or both of min(abs(diag(R)))>0∧1/min(abs(diag(R)))<λ  (a)

and min(abs(diag(R)))>0∧max(abs(diag(R)))/min(abs(diag(R)))<λ  (b)

where λ is a predetermined limit equal to or greater than approximately 1.1 and less than approximately 1,000.

8. The method of claim 5, wherein employing the sampler to acquire a sample at a random sample time within the bounded sample timing interval comprises sampling the amplitude of a sensed signal at the random sample time, and digitizing the sampled amplitude by a digital-to-analog converter.

9. The method of claim 5, wherein the bounded sample timing interval is defined by a minimum time step and a maximum time step, and wherein employing the sampler to acquire a sample at a random sample time within the bounded sample timing interval comprises:
employing a random number generator to generate a random value;
employing a sample timing module to multiply the random value by a difference between the maximum time step and the minimum time step to determine a random time step to be added to a last sample time to determine the random sample time; and
communicating the random sample time from the sample timing module to the sampler.

10. A method, comprising:
employing a processor to determine a sample timing interval, the sample timing interval being bounded by a minimum time step and a maximum time step;
employing a sampler to sample a time-varying signal at a random sample time during each sample timing interval and to output a new sample value of the time-varying signal, the sampler outputting a plurality of sample values of the time-varying signal over a plurality of the sample timing intervals;
employing a spectral estimator to determine whether a signal-to-noise ratio of an estimated spectrum of the sampled values including the new sample value is less than a target signal-to-noise ratio value,
wherein as long as the signal-to-noise ratio of the estimated spectrum is less than the target signal-to-noise ratio value, then the sampler continues to sample the time-varying signal at the random sample time during each sample timing interval and to output the new sample value, and the spectral estimator continues to determine whether the signal-to-noise ratio of the estimated spectrum of the sampled values including the new sample value is less than the target signal-to-noise ratio value, and
wherein when the signal-to-noise ratio of the estimated spectrum of the sampled values including the new sample value is at least equal to the target signal-to-noise ratio value, then the spectral estimator estimates a spectrum of the time-varying signal from the sampled values.

11. The method of claim 10, wherein the sampler stops sampling the time-varying signal when the signal-to-noise ratio of the estimated spectrum of the sampled values including the new sample value is at least equal to the target signal-to-noise ratio value.

12. The method of claim 10, wherein the minimum time step is a function of one or both of a number of frequencies in a set of predetermined frequencies of interest in the time-varying signal, and a lowest frequency in the set that is not equal to zero Hertz.

13. The method of claim 10, wherein the minimum time step, $\Delta t_{min}$, is given by $$\Delta t_{min} \geq 2/f_1/(2|F|+1)$$

where $|F|$ is the number of frequencies and $f_1$ is the lowest frequency of the set of frequencies of interest.

14. The method of claim 10, wherein the signal-to-noise ratio of the estimated spectrum of the sampled values including the new sample value is at least equal to the target signal-to-noise value when an upper right triangular factor matrix R of a QR factorization of a least squares matrix (L-S) matrix A of a least squares fit of the plurality of sample values to the estimated spectrum meets a condition given by one or both of min(abs(diag(R)))>0∧1/min(abs(diag(R)))<λ  (a)

and min(abs(diag(R)))>0∧max(abs(diag(R)))/min(abs(diag(R)))<λ  (b)

where λ is a predetermined limit equal to or greater than approximately 1.1 and less than approximately 1,000.

15. The method of claim 10, wherein the sampler acquires a timestamp associated with each sample value.

16. The method of claim 10, wherein employing the sampler to sample the time-varying signal at the random sample time during each sample timing interval comprises sampling the amplitude of the time-varying signal at the random sample time, and digitizing the sampled amplitude by a digital-to-analog converter.

17. The method of claim 10, wherein employing the sampler to sample the time-varying signal at the random sample time during each sample timing interval comprises:
   employing a random number generator to generate a random value;
   employing a sample timing module to multiply the random value by a difference between the maximum time step and the minimum time step to determine a random time step to be added to a last sample time to determine the random sample time; and
   communicating the random sample time from the sample timing module to the sampler.

18. The method of claim 10, wherein the time-varying signal is an output signal of a device under test.

19. The method of claim 13, wherein the maximum time step, $\Delta t_{max}$, is given by $$\Delta t_{max} \geq 1.5 \Delta t_{min}.$$

* * * * *

UNITED STATES PATENT AND TRADEMARK OFFICE
CERTIFICATE OF CORRECTION

PATENT NO. : 7,729,889 B2
APPLICATION NO. : 11/274213
DATED : June 1, 2010
INVENTOR(S) : Lee A. Barford It is certified that error appears in the above-identified patent and that said Letters Patent is hereby corrected as shown below:

In column 21, line 31, in Claim 7, delete "claim 1," and inert -- claim 5, --, therefor.

Signed and Sealed this

Tenth Day of August, 2010

David J. Kappos
*Director of the United States Patent and Trademark Office*